US008533185B2

(12) United States Patent
Ershov

(10) Patent No.: US 8,533,185 B2
(45) Date of Patent: *Sep. 10, 2013

(54) SEARCH ENGINE GRAPHICAL INTERFACE USING MAPS OF SEARCH TERMS AND IMAGES

(75) Inventor: Alexander V. Ershov, Sergiev Posad (RU)

(73) Assignee: Dranias Development LLC, Wilmington, DE (US)

( * ) Notice: Subject to any disclaimer, the term of this patent is extended or adjusted under 35 U.S.C. 154(b) by 430 days.

This patent is subject to a terminal disclaimer.

(21) Appl. No.: 12/234,751

(22) Filed: Sep. 22, 2008

(65) Prior Publication Data
US 2011/0047145 A1 Feb. 24, 2011

Related U.S. Application Data

(63) Continuation of application No. 11/937,630, filed on Nov. 9, 2007, now Pat. No. 7,437,370.

(60) Provisional application No. 60/890,507, filed on Feb. 19, 2007.

(51) Int. Cl.
G06F 17/30 (2006.01)

(52) U.S. Cl.
USPC .......................................... 707/723; 707/758

(58) Field of Classification Search
USPC ................... 707/723, 728, 749, 758, E17.082, 707/E17.065, E17.067, 999.006, 999.003, 707/999.01, 999.107
See application file for complete search history.

(56) References Cited

U.S. PATENT DOCUMENTS

| 5,086,479 A | 2/1992 | Takenaga et al. |
| 5,506,937 A | 4/1996 | Ford et al. |
| 5,535,303 A | 7/1996 | Ekchian et al. |
| 5,546,503 A | 8/1996 | Abe et al. |
| 5,546,529 A | 8/1996 | Bowers et al. |
| 5,548,683 A | 8/1996 | Engel et al. |
| 5,794,178 A | 8/1998 | Caid et al. |
| 5,812,134 A | 9/1998 | Pooser et al. |

(Continued)

OTHER PUBLICATIONS

Benford et al., Three Dimensional Visualization of the World Wide Web, Dec. 1999, ACM Computing Surveys, pp. 1-16.*

(Continued)

Primary Examiner — Leslie Wong

(57) ABSTRACT

A system, method and computer program product for visualization of search results includes a map displayed to a user on a screen. The map shows search query terms and optionally other terms related to the search query terms. The display of the terms corresponds to relationship between the terms. A graphical image is displayed next to at least one of the search query terms. The graphical image is associated with a URL that corresponds to a search result. The graphical image is a favorite icon that is derived from the HTML script associated with a webpage at the URL, or an animated image, or a video, or a cycling GIF. A plurality of graphical images can be displayed in proximity to the search query term. The graphical image can be a logo or a paid advertisement. A plurality of graphical images are offered for sale in association with the query search term, and a size and/or placement of each graphical image corresponds to a price paid by each purchaser, or multiple images can be displayed at the same location on the screen, and a duration of display of each graphical image corresponds to a price paid by each purchaser.

21 Claims, 4 Drawing Sheets

(56) References Cited

U.S. PATENT DOCUMENTS

| | | | |
|---|---|---|---|
| 5,819,245 A | 10/1998 | Peterson et al. | |
| 5,937,084 A | 8/1999 | Crabtree et al. | |
| 5,963,965 A | 10/1999 | Vogel | |
| 5,966,126 A | 10/1999 | Szabo | |
| 6,076,051 A | 6/2000 | Messerly et al. | |
| 6,112,203 A | 8/2000 | Bharat et al. | |
| 6,138,128 A | 10/2000 | Perkowitz et al. | |
| 6,167,398 A | 12/2000 | Wyard et al. | |
| 6,256,623 B1 | 7/2001 | Jones | |
| 6,263,335 B1 | 7/2001 | Paik et al. | |
| 6,304,864 B1 | 10/2001 | Liddy et al. | |
| 6,463,423 B1 | 10/2002 | Wada | |
| 6,574,632 B2 | 6/2003 | Fox et al. | |
| 6,615,197 B1 | 9/2003 | Chai | |
| 6,633,868 B1 | 10/2003 | Min et al. | |
| 6,640,302 B1 | 10/2003 | Subramaniam et al. | |
| 6,725,217 B2* | 4/2004 | Chow et al. | 707/706 |
| 6,829,428 B1 | 12/2004 | Quintos | |
| 6,931,604 B2 | 8/2005 | Lane | |
| 6,938,034 B1 | 8/2005 | Kraft et al. | |
| 6,999,959 B1 | 2/2006 | Lawrence et al. | |
| 7,152,064 B2 | 12/2006 | Bourdoncle et al. | |
| 7,181,438 B1 | 2/2007 | Szabo | |
| 7,296,009 B1 | 11/2007 | Jiang et al. | |
| 7,337,398 B1 | 2/2008 | Thrall et al. | |
| 7,437,370 B1* | 10/2008 | Ershov | 1/1 |
| 7,536,316 B2* | 5/2009 | Ozer et al. | 705/14.47 |
| 7,555,478 B2* | 6/2009 | Bayley et al. | 1/1 |
| 7,565,627 B2* | 7/2009 | Brill et al. | 715/854 |
| 7,584,175 B2 | 9/2009 | Patterson | |
| 7,610,195 B2 | 10/2009 | Ojanpera | |
| 7,620,607 B1 | 11/2009 | Ershov | |
| 7,627,582 B1* | 12/2009 | Ershov | 1/1 |
| 7,778,946 B2 | 8/2010 | Hercus | |
| 8,001,105 B2* | 8/2011 | Bolivar et al. | 707/709 |
| 8,296,127 B2 | 10/2012 | Marcu et al. | |
| 2002/0016782 A1 | 2/2002 | Cooper | |
| 2002/0042741 A1 | 4/2002 | Wilson et al. | |
| 2002/0042750 A1 | 4/2002 | Morrison | |
| 2002/0154167 A1* | 10/2002 | Parsons et al. | 345/764 |
| 2002/0156702 A1 | 10/2002 | Kane | |
| 2002/0174101 A1 | 11/2002 | Fernley et al. | |
| 2003/0069873 A1 | 4/2003 | Fox et al. | |
| 2003/0212663 A1 | 11/2003 | Leno et al. | |
| 2003/0212669 A1 | 11/2003 | Dedhia et al. | |
| 2003/0216919 A1 | 11/2003 | Roushar | |
| 2004/0015408 A1 | 1/2004 | Rauen, IV | |
| 2004/0078268 A1 | 4/2004 | Sprogis | |
| 2004/0083206 A1 | 4/2004 | Wu et al. | |
| 2004/0111319 A1 | 6/2004 | Matsumoto et al. | |
| 2004/0172378 A1 | 9/2004 | Shanahan et al. | |
| 2004/0181547 A1 | 9/2004 | Mazzagatti | |
| 2004/0225722 A1 | 11/2004 | Jeong | |
| 2005/0022114 A1 | 1/2005 | Shanahan et al. | |
| 2005/0080776 A1 | 4/2005 | Colledge et al. | |
| 2005/0086186 A1 | 4/2005 | Sullivan et al. | |
| 2005/0132305 A1* | 6/2005 | Guichard et al. | 715/855 |
| 2005/0144158 A1 | 6/2005 | Capper et al. | |
| 2005/0165747 A1 | 7/2005 | Bargeron et al. | |
| 2005/0165766 A1 | 7/2005 | Szabo | |
| 2005/0246296 A1 | 11/2005 | Ma et al. | |
| 2005/0278443 A1 | 12/2005 | Winner et al. | |
| 2006/0069617 A1 | 3/2006 | Milener et al. | |
| 2006/0085395 A1* | 4/2006 | Cradick et al. | 707/3 |
| 2006/0106793 A1 | 5/2006 | Liang | |
| 2006/0149721 A1 | 7/2006 | Langford | |
| 2006/0190285 A1 | 8/2006 | Harris et al. | |
| 2006/0190812 A1 | 8/2006 | Ellenby et al. | |
| 2006/0195442 A1 | 8/2006 | Cone et al. | |
| 2006/0200445 A1* | 9/2006 | Chen et al. | 707/2 |
| 2006/0200461 A1 | 9/2006 | Lucas et al. | |
| 2006/0218522 A1 | 9/2006 | Hanechak | |
| 2006/0265417 A1 | 11/2006 | Amato et al. | |
| 2006/0287919 A1 | 12/2006 | Rubens et al. | |
| 2006/0287985 A1 | 12/2006 | Castro et al. | |
| 2006/0288023 A1 | 12/2006 | Szabo | |
| 2006/0294094 A1 | 12/2006 | King et al. | |
| 2007/0009151 A1 | 1/2007 | Pittman et al. | |
| 2007/0011150 A1 | 1/2007 | Frank | |
| 2007/0073580 A1 | 3/2007 | Perry et al. | |
| 2007/0073591 A1 | 3/2007 | Perry et al. | |
| 2007/0156677 A1 | 7/2007 | Szabo | |
| 2007/0192164 A1 | 8/2007 | Nong et al. | |
| 2007/0192281 A1* | 8/2007 | Cradick et al. | 707/2 |
| 2007/0192306 A1 | 8/2007 | Papakonstantinou et al. | |
| 2007/0198951 A1 | 8/2007 | Frank | |
| 2007/0204238 A1 | 8/2007 | Hua et al. | |
| 2007/0214415 A1 | 9/2007 | Williams | |
| 2007/0219940 A1 | 9/2007 | Mueller et al. | |
| 2007/0239541 A1 | 10/2007 | Kane et al. | |
| 2007/0255671 A1 | 11/2007 | Fox et al. | |
| 2007/0294641 A1 | 12/2007 | Rashkovskiy | |
| 2008/0046406 A1 | 2/2008 | Seide et al. | |
| 2008/0052638 A1 | 2/2008 | Frank et al. | |
| 2008/0177717 A1 | 7/2008 | Kumar et al. | |

OTHER PUBLICATIONS

Benford et al., Three Dimensional Visualization of the World Wide Web, ACM Dec. 1999, pp. 1-16.*

Benford et al., Three Dimensional Visualization of the World Wide Web, 2000, ACM, pp. 1-16.

Bengio et al., "A Neural Probabilistic Language Model," Journal of Machine Learning Research 3 (2003) pp. 1137-1155.

Bloehdorn et al., "Semantic Annotation of Images and Videos for Multimedia Analysis", ESWC 2005, pp. 592-607.

Bonnyman et al. "A Neural Network Application for the Analysis and Synthesis of Multilingual Speech", 1994, SIPNN, pp. 327-330.

Brause et al. "Transform Coding by Lateral Inhibited Neural Nets", Proc. IEEE TAI, 1993, pp. 14-21.

Dursteler, Juan C., InfoVis, http://www.infovis.net/printMag.php?num=97&lang=2, KartOO, Aug. 19, 2002, 3 pages.

Final Office Action on U.S. Appl. No. 12/472,204, mailed Apr. 27, 2011.

Golstev et al., "An Assembly Neural Network for Texture Segmentation," Neural Networks, vol. 9, No. 4, Jun. 1996, pp. 643-653.

Golstev, et al., "Inhibitory Connections in the Assembly Neural Network for Texture Segmentation," Neural Networks, vol. 11, No. 5, Jul. 1998, pp. 951-962.

Hämäläinen et al., "TUTNC: a general purpose parallel computer for neural network computations," Microprocessors and Microsystems vol. 19, No. 8, Oct. 1995, pp. 447-465.

K.L. Kwok, "A Neural Network for Probabilistic Information Retrieval," Western Connecticut State University, 1989, pp. 21-30.

Kussul et al., "Structure of Neural Assembly," Neuroinformatics and Neurocomputers, RNNS/IEEE Symposium Oct. 7-10, 1992, vol. 1, pp. 423-434.

Merkl "Text classification with self-organizing maps: Some lessons learned", Neurocomputing 21 (1998) pp. 61-77.

Nejad, A & Gedeon, T. "BiDirectional Neural Network and Class Prototypes", IEEE Conf. Neural Networks, 1995, pp. 1322-1327.

Non-Final Office Action on U.S. Appl. No. 12/327,422, mailed May 9, 2011.

Non-Final Office Action on U.S. Appl. No. 11/468,692, mailed May 13, 2008.

Non-Final Office Action on U.S. Appl. No. 12/362,017, mailed Nov. 24, 2009.

Non-Final Office Action on U.S. Appl. No. 12/416,210, mailed Mar. 24, 2011.

Non-Final Office Action on U.S. Appl. No. 12/472,204, mailed Oct. 6, 2010.

Notice of Allowance on U.S. Appl. No. 12/362,017, mailed Mar. 8, 2011.

Paralic et al. "Text Mining for Documents Annotation and Ontology Support", http://people.tuke.sk/jan.paralic/papers/BookChapter.pdf, A Book Chapter in Intelligent Systems in the Service of Mankind, Nov. 2003, 11 pages.

Qin He, "Neural Network and its Application in IR," Graduate School of Library and Information Science, University of Illinois at Urbana-Champaign Spring, 1999, 31 pages.

Shmelev et al., Equilibrium Points of Single-Layered Neural Networks with Feedback and Applications in the Analysis of Text Documents, pp. 164-170, 2005.

Yusoff "Artificial Neural Networks (ANN) and its Application in Engineering", http://ppt.ump.edu.my/images/mech/ANN.pdf 6 pages, no date given.

Notice of Allowance on U.S. Appl. No. 12/327,422, mailed Mar. 2, 2012.

Non-Final Office Action on U.S. Appl. No. 12/618,733, mailed Aug. 1, 2012.

Non-Final Office Action on U.S. Appl. No. 12/416,210, mailed Sep. 19, 2011.

Notice of Allowance on U.S. Appl. No. 12/472,204, mailed Aug. 10, 2011.

Final Office Action on U.S. Appl. No. 12/327,422, mailed Oct. 25, 2011.

El-Kwae, et al, "Tug-Of-War: A Simple 2D Web Visualization Technique," Proceedings SPIE vol. 4665, Visualization and Data Analysis 2002, pp. 207-217.

Fagan, Jody Condit, "Basic Search and Visual Search: Usability Tests with EBSCOhost," Electronic Resources & Libraries conference, Mar. 24, 2006, 59 pages.

Jones, Steve, "Graphical Query Specification and Dynamic Result Preview for a Digital Library," Symposium on User Interface Software and Technology Archive, Proceedings of the 11th Annual ACM symposium on User Interface Software and Technology, Table of Contents, Year of Publication, 1998, pp. 143-151.

Tomita et al., "Interactive Web Search by Graphical Query Refinement," Poster Proceedings of the 10th International World Wide Web Conference (WWW10), 2001 pp. 190-191.

Final Office Action on U.S. Appl. No. 12/618,733, mailed Nov. 30, 2012.

Notice of Allowance on U.S. Appl. No. 12/618,733, mailed May 14, 2013.

* cited by examiner

| Quintura | Find | jaguar | 🔍 | Save it! | Share it! | Invite a Friend! |

Settings | Help

[ Web | Images | Video | Amazon ]

land rover                      Pages found – 38200000

⊖ performance    ○ review

⊙ type           order part dealer
                ⊟ price quotes car
galpin

⊘ 📷 jaguar model
               ⊟ jag
⊛ atari                fact

W wikipedia xk

📷 1. jaguar
Official site of the Ford Motor Company division featuring new Jaguar models and local dealer information. http://www.jaguar.com/

2. <u>One World Journeys I Jaguar : Lord of the Mayan Jungle</u> A multimedia expedition into the heart of the Mexican jungle, searching for the elusive jaguar.
http://www.oneworldjourneys.com/jaguar, 32Kb 3. <u>Jaguar</u>
Compares jaguars and leopards and provides information about the animal's shrinking habitat and relationship with man.
http://www.bluelion.org/jaguar.htm, 13Kb ⊘ 4. <u>Jaguars.com: The Official Website of the NFL's Jacksonville Jaguars</u> Official site of the Jaguars. Includes schedule, news, multimedia, photos, player information, statistics, team store, tickets, and more. http://www.jaguars.com/, 57Kb 📷 5. <u>Jaguar US – Home</u>
Jaguar USA Official Home Page ... Build Your XK. Build your Jaguar. Request Brochure. Get Email Updates. Locate a Dealer. Search Site Map Contact Us Privacy Policy ...
http://www.jaguar.com/us/en/home.htm, 19Kb W 6. <u>Jaguar – Wikipedia, the free encyclopedia</u>
The Jaguar is the third-largest feline after the Tiger and Lion, being on ... habitat, the Jaguar will range across ... Jaguar at the Henry Doorly Zoo ...
http://en.wikipedia.org/wiki/Jaguar, 109Kb 7. <u>Jaguar</u>
Groove-oriented music with influences in funk, latin, soul, and rock.
http://www.jaguar.is/, 27Kb W 8. <u>Atari Jaguar – Wikipedia, the free encyclopedia</u>
The Jaguar was the last game system to be marketed by Atari Corporation. ... Production of the Jaguar stopped after Atari merged with JT Storage in a reverse ...
http://en.wikipedia.org/wiki/Atari_Jaguar, 38Kb

FIG.1

| Quintura | Find  jaguar  🔍  Save it!  Share it!  Invite a Friend! | Settings | Help |

Web | Images | Video | Amazon

Pages found – 38200000

🅛🅡 land rover performance    review type           order
     part dealer
               price quotes car
galpin 🐆 jaguar
  JAGUAR model
            jag
🕹 ATARI           fact ⭕ wikipedia xk

FIG.2

1. jaguar
   Official site of the Ford Motor Company
   division featuring new Jaguar models and local
   dealer information.    http://www.jaguar.com/

2. One World Journeys I Jaguar : Lord of the Mayan
   Jungle A multimedia expedition into the heart
   of the Mexican jungle, searching for the
   elusive jaguar .
   http://www.oneworldjourneys.com/jaguar, 32Kb 3. Jaguar
   Compares jaguars and leopards and provides
   information about the animal's shrinking habitat
   and relationship with man.
   http://www.bluelion.org/jaguar.htm,  13Kb 4. jaguars .com: The Official Website of the NFL's
   Jacksonville Jaguars Official site of the Jaguars.
   Includes schedule, news, multimedia, photos,
   player information, statistics, team store,
   tickets, and more.  http://www.jaguars.com/, 57Kb 5. Jaguar US – Home
   Jaguar USA Official Home Page ... Build Your XK.
   Build your Jaguar. Request Brochure. Get Email
   Updates. Locate a Dealer. Search Site Map Contact
   Us Privacy Policy ...
   http://www.jaguar.com/us/en/home.htm, 19Kb 6. Jaguar – Wikipedia, the free encyclopedia
   The Jaguar is the third-largest feline after the
   Tiger and Lion, being on ... habitat, the Jaguar will
   range across ... Jaguar at the Henry Doorly Zoo ...
   http://en.wikipedia.org/wiki/Jaguar, 109Kb 7. Jaguar
   Groove-oriented music with influences in funk,
   latin, soul, and rock.
   http://www.jaguar.is/, 27Kb 8. Atari Jaguar – Wikipedia, the free encyclopedia
   The Jaguar was the last game system to be
   marketed by Atari Corporation. ... Production of the
   Jaguar stopped after Atari merged with JT Storage
   in a reverse ...
   http://en.wikipedia.org/wiki/Atari_Jaguar, 38Kb

| Quintura | Find | rental | 🔍 | Save it! | Share it! | Invite a Friend! |

Settings | Help

Web | Images | Video | Amazon

Pages found − 38200000 puerto vallarta discount car rental deal

≋ ENTERPRIZE
≋ RENT-A-CAR vacation        fremont apartment offer
       rental

△ ADVANTAGE
RENT-A-CAR

🌴 LANZAROTE rent truck
       online

1. Avis Rent A Car
   Rental cars and SUVs from Avis. Check rates and make reservations to rent a car in cities worldwide, find special deals and discounts, or become a registered Avis member to create personal itineraries and profiles
   http://www.avis.com/
2. Hertz Car Rental
   Official site from Ford Motor Company. Hertz includes a fleet guide with details on their vehicles and a worldwide directory of car rental offices.
   http://www.Hertz.com/
3. Budget Rent A Car Official Site − Budget.com
   Provides vehicle rentals, including cars, trucks, vans, and SUVs. Highlights Budget Rent A Car rates, reservations, locations, and programs.
   http://www.budget.com/
4. National − Green means go.
   Features online reservations and information about National's corporate travel programs and travel partners. Includes a worldwide search for National Car Rental pickup and dropoff locations.
   http://www.nationalcar.com/
5. Car Rental at Alamo Rent A Car
   Includes Alamo Rent A Car online reservations, national and international locations, fleet information, and weekly specials. A Vanguard Car Rental USA Inc. company.   http://www.alamo.com/
6. Car Rental Deals at RentalCars.com
   Offers car rental discounts, reservations, coupons, comparisions, and a newsletter.
   http://www.rentalcars.com/
7. Dollar Rent A Car Official Site − Dollar.com
   Rents vehicles to business and leisure customers and offers association programs, corporate accounts, and franchise opportunities. Dollar Rent A Car offers special rates and reservations online.
   http://www.dollar.com/
8. Budget Truck Rental Online Deals
   Maintains a fleet of vans and trucks for household movers and commercial customers.

FIG.3

SEARCH ENGINE GRAPHICAL INTERFACE USING MAPS OF SEARCH TERMS AND IMAGES

CROSS REFERENCE TO RELATED APPLICATIONS

This application is a continuation of U.S. patent application Ser. No. 11/937,630, filed on Nov. 9, 2007, entitled SEARCH ENGINE GRAPHICAL INTERFACE USING MAPS AND IMAGES, which is a non-provisional of U.S. Provisional Patent Application No. 60/890,507, filed 19, Feb. 2007, entitled SEARCH ENGINE GRAPHICAL INTERFACE USING MAPS AND IMAGES, which is incorporated herein by reference in its entirety.

BACKGROUND OF THE INVENTION

1. Field of the Invention

The present invention relates to techniques for visualization of search engine output as a means for assisting the user in selecting relevant search results, and to a graphical user interface for displaying search results of search engines.

2. Description of the Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks that point to web pages in which a user is interested. Generally, search engines base their determination of the user's interest on search terms (called a "search query") entered by the user. The goal of the search engine is to provide links, based on the search query, to high quality, relevant results to the user. Typically, a conventional search engine accomplishes this by matching the terms in the search query to a set of pre-stored web pages. Web pages that contain the user's search terms are "hits" and are returned to the user.

To build complex queries, a query language can be used. Almost every search engine uses such a language, and with the help of logical (Boolean) operations, a user can point out the words that need to be present (or absent) in the required document, show how far apart they can be from each other, enumerate synonyms, and identify possible unwanted words in the required document. Unfortunately that language requires special knowledge, and a change in the usual approach of most lay users, which makes the language practically inaccessible for most users. Therefore, all search engines use an extra page, hidden "behind" the main search page.

Conventional search engines also use the standard concept of a command line to type in a query, and return a number of hyperlinks as the search result.

One of the problems in modern search engine development is being able to present information to the user in the most intuitive manner. Currently, conventional systems, in response to a user query, display a list of links to websites that the search engine considers relevant in some sense. Generally, the ordering of the links in the display is indicative of greater or lesser relevance of the particular search result, based on some algorithm utilized by the search engine to assess the relevance of a particular webpage. Also, conventional search engines can display small excerpts from the text on the websites, typically the text that is found close to the query terms. This assists the user in quickly estimating whether the text (and, presumably, the entire website to which the hyperlink points) is more or less relevant to the search results he is seeking.

One difficulty with this approach is the considerable burden placed on the user in having to read what may be a significant amount of text—in other words, placing an obstacle between the results that the user is seeking, and the amount of mental effort needed to sort through the results provided by the search engine. Even in the case where the most relevant search result is close to the top of the ranking, nonetheless, some effort and time by the user is necessary, if only to "digest" the text of the annotations provided by the search engine.

Recently, some search engines (e.g., Yandex) have begun placing small graphical elements next to each search result. This is possible because the latest versions of the browsers now support displays of what is called "favorite icons," which is a small graphical image displayed next to the address when the website is accessed. For example, when accessing Google, a graphical "G" appears to the left of the URL. The format of these "favorite icons" is standardized, and increasingly, more and more websites provide for such favorite icons, as yet another mechanism for displaying brand information to the user. It should be noted, of course, that not all search engine websites have such favorite icons, nonetheless, the practice is becoming increasingly prevalent, particularly for websites operated by commercial enterprises.

Nevertheless, the problem of displaying search results in a manner that is intuitive and easy for the user to navigate remains. The overriding goal of a search engine is to return the most desirable set of links for any particular search query. Accordingly, there is a need in the art for an effective and efficient system and method for presenting search results and search context as an aid to context-based searching.

SUMMARY OF THE INVENTION

Accordingly, the present invention is related to a system and method for using graphical maps and images as a user interface for presenting search engine output results that substantially obviates one or more of the disadvantages of the related art.

In one aspect, there is provided a system, method and computer program product for visualization of search results including (a) a map displayed to a user on a screen, the map showing search query terms and optionally other terms related to the search query terms, wherein a location of the terms relative to each other corresponds to contextual relationship between the terms; and (b) at least one graphical image displayed next to at least one of the search query terms. The graphical image is associated with a URL that corresponds to a search result.

The graphical image can be a favorite icon that can be derived from the HTML script associated with a webpage at the URL, or an animated image, or a video, or a cycling GIF, or a logo, or a flash video, or a paid advertisement. The video can be played upon a user selecting a thumbnail of the video, or can be autostarted upon download of the webpage displaying the map. A plurality of graphical images can be displayed in proximity to the search query term.

A plurality of graphical images can be offered for sale in association with the query search term, and wherein a size of each graphical image corresponds to a price paid by each purchaser. A plurality of graphical images are offered for sale in association with the query search term and displayed at the same location on the screen, and wherein a duration of display of each graphical image corresponds to a price paid by each purchaser. A portion of the displayed screen showing search result hyperlinks and associated annotations. The graphical image can be a thumbnail of an image from a webpage at the URL. The map can be displayed as a three-dimensional entity with the graphical images shown in proximity to the search terms.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 1 illustrates a two-dimensional interpretation map of search results using favorite icons.

FIG. 2 illustrates use of logos in the map.

FIG. 3 illustrates use of advertisements in the map.

DETAILED DESCRIPTION OF THE PREFERRED EMBODIMENTS

Figure 4:
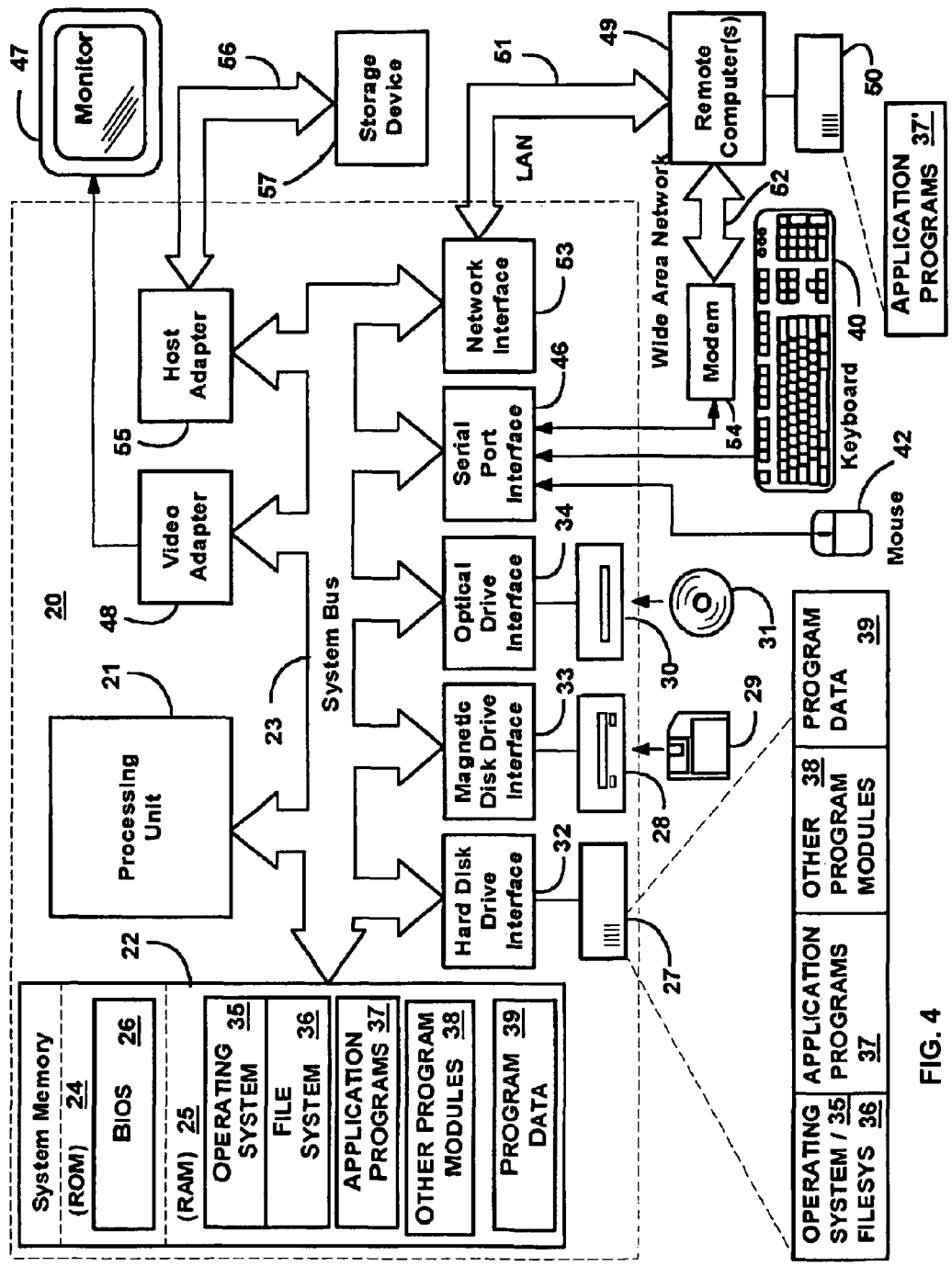
FIG. 4 illustrates an exemplary computer system on which the invention may be implemented.

Reference will now be made in detail to the embodiments of the present invention, examples of which are illustrated in the accompanying drawings.

Accordingly, the present invention is directed to a system and method for using graphics to visualize search engine results that obviate one or more of the disadvantages of the related art.

The present invention is generally directed to the use of graphical symbols, images, animation, and various other forms of presenting graphical information, in the context of displaying search results. In particular, the present invention is directed to the use of a search results map, as illustrated in FIG. 1, which is shown to the user in response to the user's query. The use of such maps is described in U.S. patent application Ser. No. 11/468,692, Filed: Aug. 30, 2006, entitled: CONTEXT-BASED SEARCH VISUALIZATION AND CONTEXT MANAGEMENT USING NEURAL NETWORKS, which is incorporated herein by reference in its entirety.

The search results are displayed in what may be called a dual form—part of the screen is devoted to a map, on which the search terms are shown (generally, the search terms are emphasized or highlighted on a screen in some fashion, for example, by using color, e.g., red for the term actually used by the user in constructing the search query, by using bold font, by using larger font sizes, etc.), and other words shown on the map are generated by, for example, a neural network, and are generally "connected" or "related" in some fashion to the query terms that the user has inputted into the search engine, as described in U.S. patent application Ser. No. 11/468,692.

Another portion of the display is dedicated to the hyperlinks to the found web pages and websites, and the annotations associated with those search results. Generally, the results that are considered the most relevant are displayed at the top, as the user would expect.

In addition to the graphical user interface in the form of a map, the present invention utilizes graphical images next to the search terms, where the images are associated with the website identified by the search engine. For example, consider the display of the search results in FIG. 1, where the search terms are "jaguar" and "car", resulting in the identified search results shown on the right of the page, and the map shown on the left. Note the small image next to the word "jaguar," which is the favorite icon for the website for Jaguar (the car company), and is "pulled off" the HTML script for the page at http*//www*jaguar*com/global/default*htm (i.e., one of the pages identified by the search engine as highly relevant to the query). By clicking on the graphical image next to the word "jaguar" in the map, the user is automatically taken to the website at http*//www*jaguar*com/global/default*htm, same as he would have been, were he to click to the search result on the right, where the search results are displayed in hyperlink form. Thus, this simplifies, for the user, the process of actually reaching the website that he is seeking (assuming, of course, that, in this case, Jaguar the car company is what he was looking for).

Thus, in a broad sense, the discussion herein is related to the use of graphical images, in conjunction with a map-like display, that are used for managing the context of search queries for search engines. It should be noted that one source of such graphical images is the favorite icons that are provided with the HTML script for many web pages. If the web page does not provide such a favorite icon, a generic icon can be used in its place.

Furthermore, although providing favorite icons in the form of small pictures is one way to display such information, the graphical image next to the word (in this case, "jaguar") can be a more complex graphic—for example, it can be an animated graphic, such as animated GIFs, it can be a video or other animation, flash, etc. Most browsers support displays of cycling or animated GIFs, though not all current browsers support full video. The video player can be launched in the background, if necessary (for example, a lightweight version of Media Player). The video can be played in response to the user clicking on the thumbnail, or can be auto-launched once the page is downloaded (or the user can optionally have a setting to auto-launch the videos, or not).

As yet another option, the map can be a three-dimensional "topographic" map, displayed on a screen as if viewed at an angle downward, such that the different search terms and graphical elements can be located at various "coordinates" in three degrees of freedom (X, Y, Z), with the user being able to drag-and-rotate the map using a mouse, and with the relative distance between the elements and their height corresponding to relevance and interrelationships to each other. Similarly, the search terms and the graphical elements can be three-dimensional as well (e.g., showing a small three-dimensional "thumbnail" of Jaguar the car that rotates when the map is dragged to be rotated)

The content of such images or video can be commercial images that are identified with a particular word (for example, trademarks, logos, etc.—see FIG. 2), or they may be simply pictures of the items (for example, next to the word "computer," a picture of a computer, or, if the search engine determines that the jaguar in which the user is interested is actually the animal, and not the car, a small picture of the animal jaguar may be displayed next to the word "jaguar").

It will also be appreciated that where the search engine determines that there are several possible results (and therefore several possible images) that needs to be displayed next to the word (for example, where the search query is structured in such a way that it is difficult to determine that jaguar the car is substantially more likely what the user is looking for, compared to jaguar the animal), then more than one such image may be displayed next to the query term, and by clicking on each such image, the user can then be taken to the relevant website.

It will also be appreciated that by displaying the information in a more graphical format, such as by using images as discussed above, the need for displaying of the actual links and the annotations to the web pages, as shown in FIG. 1, becomes less pronounced. Thus, it is expected that by using the present invention, the amount of "screen real estate" that needs to be allocated to such listings of results will be smaller, and, in some cases (for example, if the user selects an appropriate setting), can be avoided altogether.

Alternatively, the amount of annotations associated with each found result may be reduced, particularly where the image is determined, in some fashion, to be as informative as the annotation. This, of course, is obviously subject-dependent and context dependent, nevertheless, this presents an opportunity to reduce the amount of clutter on the screen, and reduce the amount of reading that the user needs to do, in order to "get to" the result that he is ultimately interested in.

It will also be appreciated that the placement and use of such images by search engines can be a source of revenue for the search engines. For example, the seller of a particular product or service may choose to purchase the right to have his trademark or logo placed next to a particular word. In some cases, several buyers may be interested in "purchasing" the same word (but each with his own image—see FIG. 3, where images relating to car rental are shown, presumably purchased by different car rental companies). In this case, several such images can be displayed next to, or around, the word at issue. Alternatively, only a single image, in the form of an animated or cycling GIF can be displayed, with two or more such images (e.g., logos of different car rental companies) being displayed sequentially to the user. Furthermore, where one such buyer is willing to pay more than another buyer, the duration of the display for buyer 1 in the cycling GIF may be longer than the duration of the display of the cycling GIF for buyer 2. As yet another alternative, depending on how much a buyer is willing to pay, the size of the image can vary, with higher price being paid for larger images.

With reference to FIG. 4, an exemplary computer system, where the invention can be implemented, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment of a system and method, it should be apparent to those skilled in the art that certain advantages of the described method and apparatus have been achieved. In particular, it should be appreciated by those skilled in the art that system and method described in the preferred embodiment provides efficient support for hardware virtualization. It should also be appreciated that various modifications, adaptations, and alternative embodiments thereof may be made within the scope and spirit of the present invention. The invention is further defined by the following claims.

What is claimed is:

1. A system for visualization of search results, comprising: a computing device configured to:

display a plurality of search query terms and additional terms derived from the search query terms, wherein each of the plurality of search query terms and additional terms is contextually located relative to the other search query terms and the other additional terms, wherein a first additional term is positioned between a first query term and a second additional term based upon an association of the first additional term with the first query term and the second additional term;

display a plurality of links associated with the plurality of search query terms and additional terms; and display a plurality of images, wherein each of the plurality of images is associated with and located adjacent to at least one of the plurality of search query terms or additional terms, and wherein at least one of the plurality of images is derived from one of the links associated with the plurality of search query terms and additional terms.

2. The system of claim 1, wherein each image of the plurality of images is at least one of a favorite icon, an animated image, a thumbnail of a webpage image, or a video.

3. The system of claim 2, wherein the favorite icon is derived from hypertext markup language (HTML) script associated with a webpage.

4. The system of claim 1, wherein each image of the plurality of images is an advertisement, and each image is associated with a display duration.

5. The system of claim 1, wherein the computing device is further configured to determine the contextual location of the plurality of search query terms and additional terms based on a relevance of one term to a conceptual environment of the other terms.

6. The system of claim 1, wherein the computing device is further configured to display annotations associated with each link of the plurality of links.

7. The system of claim 1, wherein displaying the plurality of search query terms and the additional terms comprises displaying the plurality of search query terms and the additional terms as a three-dimensional map.

8. A method for visualization of search results, the method comprising:

displaying, using a processor, a plurality of search query terms and additional terms derived from the search query terms, wherein each of the plurality of search query terms and additional terms is contextually located relative to the other search query terms and the other additional terms, wherein a first additional term is positioned between a first query term and a second additional term based upon an association of the first additional term with the first query term and the second additional term;

displaying a plurality of links associated with the plurality of search query terms and additional terms; and displaying a plurality of images, wherein each of the plurality of images is associated with and located adjacent to at least one of the plurality of search query terms or additional terms, and wherein at least one of the plurality of images is derived from one of the links associated with the plurality of search query terms and additional terms.

9. The method of claim 8, wherein each image of the plurality of images is at least one of a favorite icon, an animated image, a thumbnail of a webpage image, or a video.

10. The method of claim 9, wherein the favorite icon is derived from hypertext markup language (HTML) script associated with a webpage.

11. The method of claim 8, wherein each image of the plurality of images is an advertisement, and each image is associated with a display duration.

12. The method of claim 8, further comprising determining the contextual location of the plurality of search query terms and additional terms based on a relevance of one term to a conceptual environment of the other terms.

13. The method of claim 8, further comprising displaying annotations associated with each link of the plurality of links.

14. The method of claim 8, wherein displaying the plurality of search query terms and the additional terms comprises displaying the plurality of search query terms and the additional terms as a three-dimensional map.

15. A non-transitory computer-readable medium having instructions stored thereon that, if executed by a computing device, cause the computing device to perform operations comprising:

displaying a plurality of search query terms and additional terms derived from the search query terms, wherein each of the plurality of search query terms and additional terms is contextually located relative to the other search query terms and the other additional terms, wherein a first additional term is positioned between a first query term and a second additional term based upon an association of the first additional term with the first query term and the second additional term;

displaying a plurality of links associated with the plurality of search query terms and additional terms; and displaying a plurality of images, wherein each of the plurality of images is associated with and located adjacent to at least one of the plurality of search query terms or additional terms, and wherein at least one of the plurality of images is derived from one of the links associated with the plurality of search query terms and additional terms.

16. The computer-readable medium of claim 15, wherein each image of the plurality of images is at least one of a favorite icon, an animated image, a thumbnail of a webpage image, or a video.

17. The computer-readable medium of claim 16, wherein the favorite icon is derived from hypertext markup language (HTML) script associated with a webpage.

18. The computer-readable medium of claim 15, wherein each image of the plurality of images is an advertisement, and each image is associated with a display duration.

19. The computer-readable medium of claim 15, wherein the operations further comprise determining the contextual location of the plurality of search query terms and additional terms based on a relevance of one term to a conceptual environment of the other terms.

20. The computer-readable medium of claim 15, wherein the operations further comprise displaying annotations associated with each link of the plurality of links.

21. The computer-readable medium of claim 15, wherein displaying the plurality of search query terms and the additional terms comprises displaying the plurality of search query terms and the additional terms as a three-dimensional map.

* * * * *

UNITED STATES PATENT AND TRADEMARK OFFICE
CERTIFICATE OF CORRECTION

| | | |
|---|---|---|
| PATENT NO. | : 8,533,185 B2 | Page 1 of 1 |
| APPLICATION NO. | : 12/234751 | |
| DATED | : September 10, 2013 | |
| INVENTOR(S) | : Alexander V. Ershov | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 640 days.

Signed and Sealed this
Third Day of March, 2015

Michelle K. Lee
*Deputy Director of the United States Patent and Trademark Office*